United States Patent [19]

Meyers et al.

[11] Patent Number: 5,578,391
[45] Date of Patent: Nov. 26, 1996

[54] BATTERY PACK HAVING A DISCONNECT SWITCH CIRCUIT

[75] Inventors: David M. Meyers, Dacula; José M. Fernandez, Lawrenceville, both of Ga.; James R. Brunette, Wheeling, Ill.

[73] Assignee: Motorola, Inc., Schaumburg, Ill.

[21] Appl. No.: 533,428

[22] Filed: Sep. 25, 1995

[51] Int. Cl.$^6$ .................................................. H01M 10/46
[52] U.S. Cl. .............................................. 429/97; 429/123
[58] Field of Search ..................................... 429/7, 97, 123

[56] References Cited

U.S. PATENT DOCUMENTS

| | | | |
|---|---|---|---|
| 4,910,103 | 3/1990 | Yoshikawa et al. | 429/7 X |
| 5,149,604 | 9/1992 | Nakanishi | 429/97 |
| 5,150,033 | 9/1992 | Conway | 429/7 X |
| 5,248,570 | 9/1993 | Meier | 429/97 X |
| 5,294,496 | 3/1994 | Sato | 429/123 X |

*Primary Examiner*—Stephen Kalafut
*Attorney, Agent, or Firm*—Scott M. Garrett

[57] ABSTRACT

A battery pack (10) having a protruding battery contact (14) is provided with a disconnect switch circuit. The circuit comprises at least one battery cell (22), and a mechanical switch (24) which controls åoperation of an electronic switch circuit (36). A latch member (16) is provided for attaching the battery pack to a device to be powered, and is moveable between a first and second position, and is biased by a spring means to the first position. In the first position, the latch member acts on the mechanical switch such that the electronic switch circuit disconnects the battery contact from the battery cell or cells. When the latch member is moved to the second position (17), the circuit operates to connect the battery contact to the battery cell or cells.

11 Claims, 4 Drawing Sheets

5,578,391

BATTERY PACK HAVING A DISCONNECT SWITCH CIRCUIT

TECHNICAL FIELD

This invention relates in general to battery packs, and in particular to battery packs having self actuating disconnect switches.

BACKGROUND OF THE INVENTION

The safety of portable energy storage systems, such as rechargeable battery packs, is a primary concern among reputable manufacturers. A significant portion of the cost of a typical battery pack results from the inclusion of safety mechanisms. One such safety mechanism is a polyswitch. The use of polyswitches is well known in the art, and they are very effective at preventing high current short circuit events, commonly referred to as a hard short circuit, across battery terminals. However, loads applied to the terminals which do not draw enough current to trip the polyswitch may occur, and may produce a safety hazard. Such short circuit conditions are referred to as a soft short circuit.

Since battery packs for cellular phones and two way hand held radios will often fit within one's pocket, the potential for shoring such batteries exist due to the fact that conductive members such as coins and keys are often carded in pockets as well. These conductive members are generally flat. To minimize the occurrence of shorts circuits from flat conductive members, the battery contacts are often recessed from the surface of the battery housing. The corresponding contacts to which the battery pack attaches generally protrude from the device, and are located such that when the battery pack is attached, they are hidden from view between the device and the battery pack.

However, it may be the case that the surface to which the battery pack attaches is visible during a portion of its operation time. This would be true, for example, with a cellular phone normally powered through a power cord, such as in an automobile. It would be of great convenience to a user of such a device if the device could be taken from the automobile under battery power. Since the major surfaces of the device are normally visible, having battery contacts protrude from the device would detract from its ornamental appearance. This suggests that the opposite situation described above be implemented: recessed contacts on the device, and protruding contacts from the battery pack. A polyswitch can still be used to prevent hard short circuits, but protruding contacts present a soft short circuit issue.

Therefore, there exists a need in a battery pack having protruding contacts, which attaches to a portable device, for a means by which to prevent soft short circuits from occurring when the battery contacts are exposed.

DETAILED DESCRIPTION OF THE PREFERRED EMBODIMENT

Figure 1:
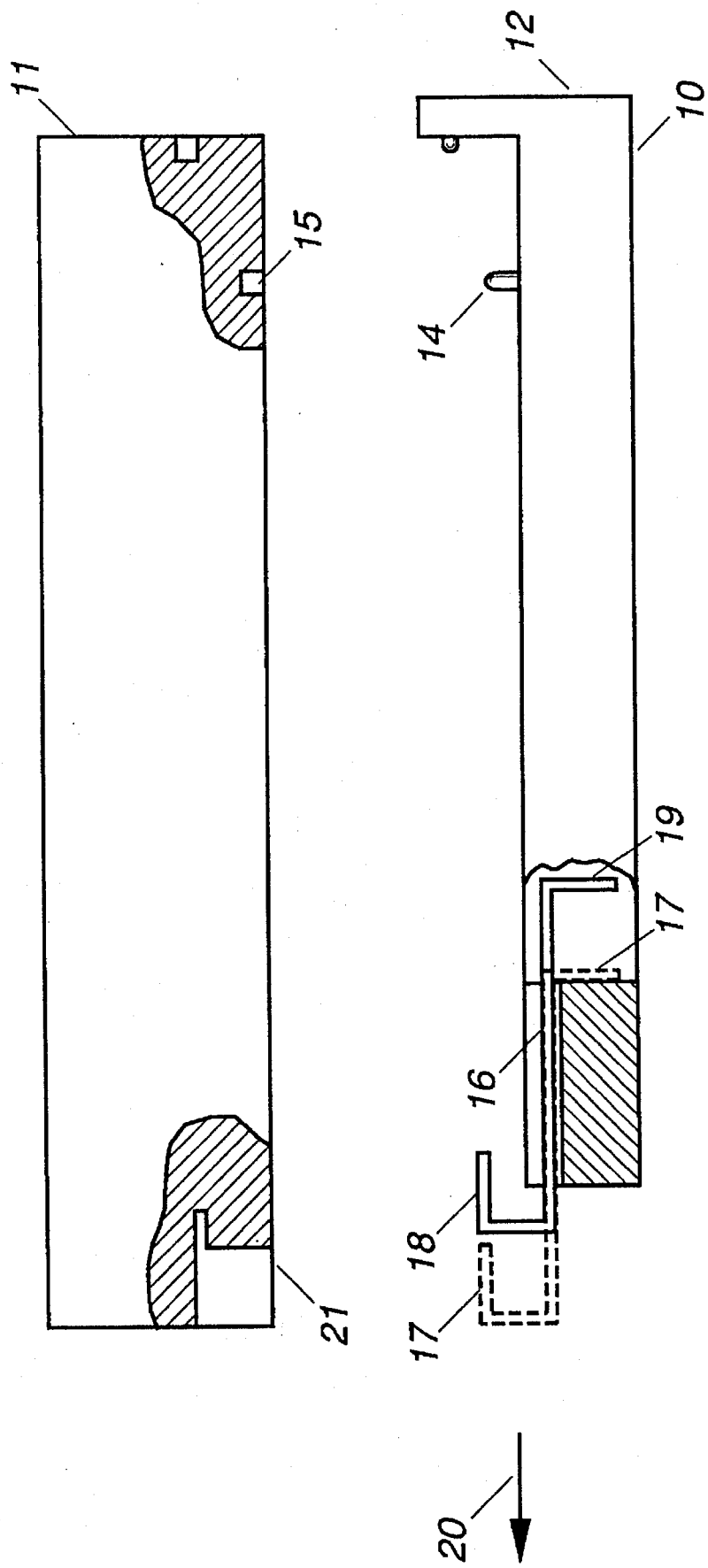
FIG. 1 is an illustration of a side view of a battery pack in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, an illustration of a side view of a battery pack 10 in accordance with the instant invention, and a generic portable device 11 to which the battery pack attaches for powering the device. The device could be, for example, a cellular phone, portable radio, or cordless power tool. The battery pack 10 is comprised of a casing, or housing 12 fabricated from an electrically insulative material, such as, for example, plastic. The battery pack has a battery contact 14, which is a conductive material such as, for example, nickel or steel. The battery contact 14 protrudes from the battery pack, and corresponds to a contact 15 located on the device 11 which the battery pack is to be attached. In one embodiment of the invention more than one battery contact is present, and all of them correspond to contacts on the device. The battery pack will typically have at least two protruding battery contacts, but the instant discussion is concerned only with one particular battery contact. Where more than one battery contact is used, it is preferred that the contacts be spring mounted to allow for variations in contact depth on the device. A latch member 16, shown here mostly in phantom, is disposed in the battery pack, and may include an engaging portion 18. The latch member has an actuating portion 19 formed, for example, by turning an end of the latch member downwards. The latch member is used for attaching the battery pack to the device. The engaging portion engages structure 21 on the device, which moves the latch member from a first position, in which it is shown, to a second position 17, shown in phantom, along the axis of arrow 20.

Figure 2:
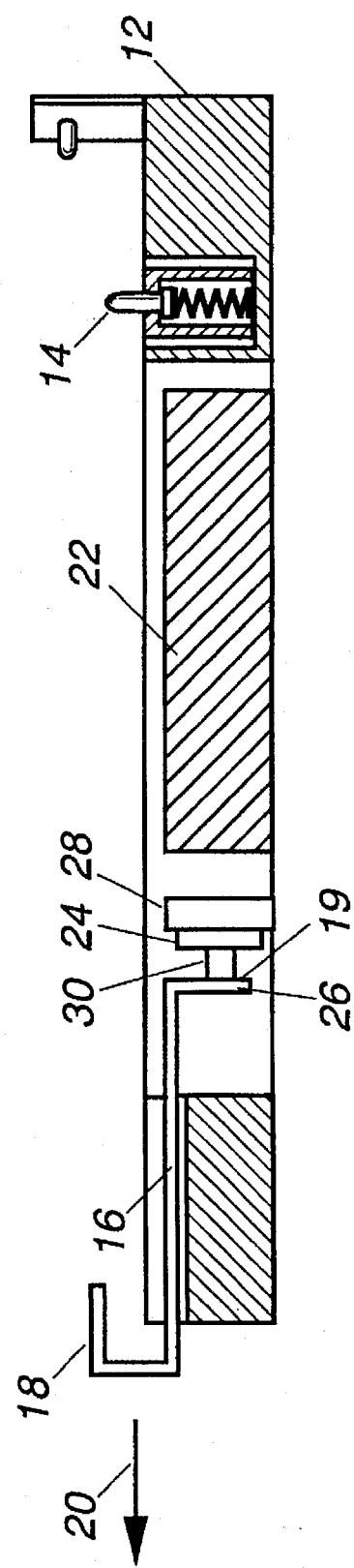
FIG. 2 is an illustration of a side cut away view of a battery pack in accordance with the invention.

Referring now to FIG. 2, an illustration of a side cut away view of a battery pack 10 in accordance with the invention. The battery pack further includes at least one battery cell 22, a mechanical switch 24, and a spring means 26. The mechanical switch is supported by a support rib 28. In one embodiment, the mechanical switch is a normally open push-button switch with a push button 30. The push-button switch closes, i.e. allows electrical conduction, when the push-button 30 is depressed. The spring means 26 biases the latch member 16 into the first position such that the actuating portion bears against the push-button, thereby depressing the push-button and closing the mechanical switch. Thus, the mechanical switch 24 is closed when the latch member 16 is in the first position. It will be appreciated by those skilled in the art that the latch member, spring means and mechanical switch may be configured in such a way that the mechanical switch is open when the latch member is in the first position. When the battery pack is attached to the device, the latch member is moved to its second position, thereby causing the mechanical switch to change states, i.e. from closed to open.

Figure 3:
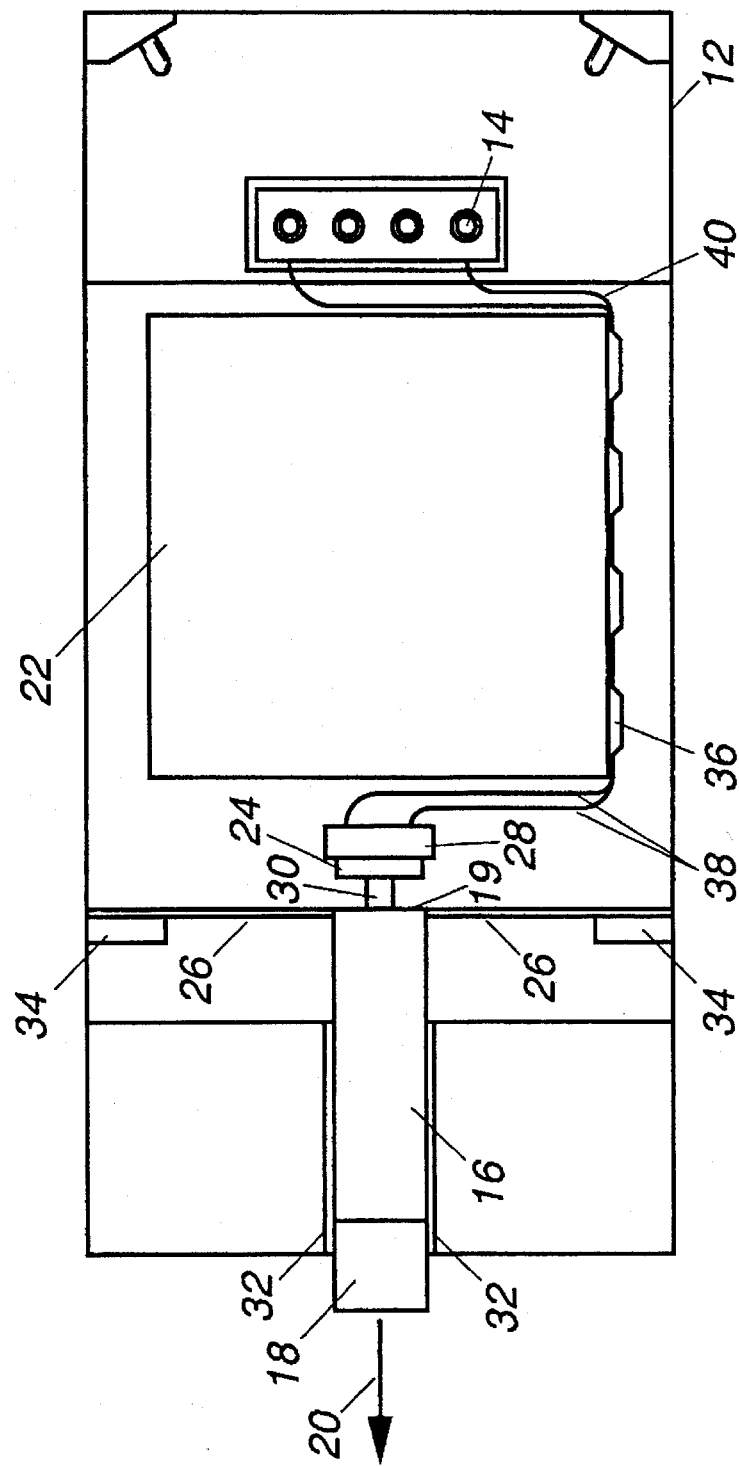
FIG. 3 is an illustration of a top plan view of a battery pack, in accordance with the invention, with the cover removed.

Referring now to FIG. 3, an illustration of a top plan view of a battery pack 10 in accordance with the invention, and with the cover removed. A pair of guide rails 32 guide the latch member 16 so that it can only travel in the direction of arrow 20. Further, it can be seen in the drawing that the spring means 26 used to bias the latch member is a pair of cantilevered arms extending from the latch member. It is contemplated that the latch member could be biased with only one cantilevered arm, or that a spiral wound spring may be used instead of, or in addition to a cantilevered arm. The cantilevered arms each bear against a corresponding support wall 34. Alternatively a cantilevered bereft could be disposed between the two supporting walls 34, behind the actuating portion of the latch member.

Further included in the battery pack 10 is an electronic switch circuit 36, which is controlled by the mechanical switch 24. The electronic switch circuit connects the battery cell 22 to the battery contact 14 when the latch member is in the first position, as a result of the state of the mechanical switch, and disconnects the battery cell from the battery contact when the latch member is moved to the second position. The mechanical switch is connected to the electronic switch circuit by, for example, wires 38. The electronic switch circuit is mounted on a circuit substrate 40, preferably a flexible circuit substrate.

Figure 4:
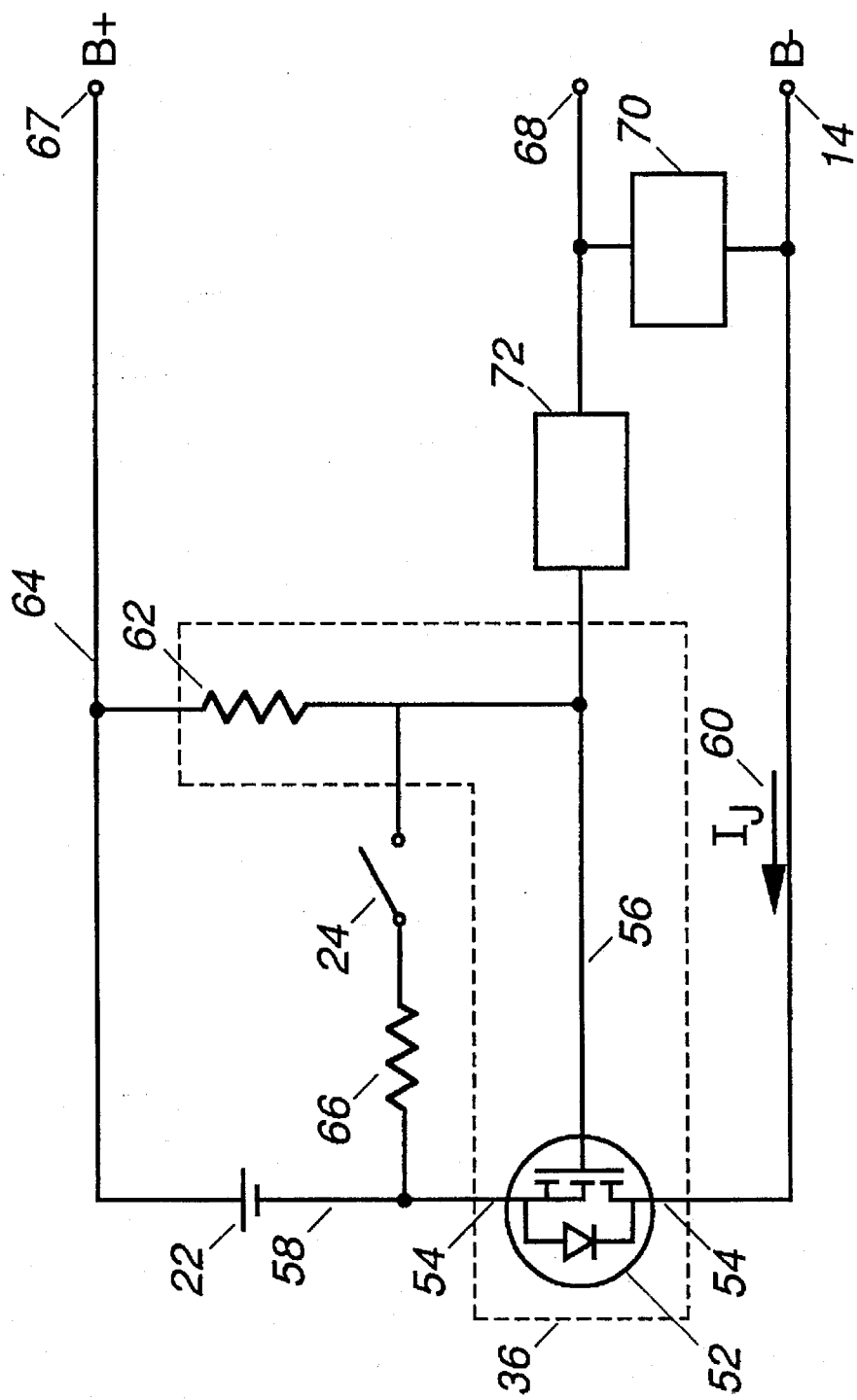
FIG. 4 is an illustration of a circuit diagram for a switch circuit in accordance with the invention.

Referring now to FIG. 4, an illustration of a circuit diagram 50 for a switch circuit in accordance with the invention. There is shown therein at least one battery cell 22, a mechanical switch 24, and an electronic switch circuit 36. The latch member controls the operation of the mechanical switch, and the mechanical switch controls the operation of the electronic switch circuit. The electronic switch circuit comprises a semiconductor switch 52, such as, for example, a MOSFET, having power terminals 54 and a control terminal 56. The power terminals are connected in series between the negative terminal 58 of the battery cell or cells and the battery contact 14. If a MOSFET switch is used, it must be connected as shown due to the intrinsic diode of the MOSFET. If it were reversed it would not block current in the discharge direction, along arrow 60. A pull up resistor 62 is connected between the control terminal 56 and the positive terminal 64 of the battery cell or cells. The mechanical switch 24 is connected in series with a pull down resistor 66 between the control terminal 56 and the negative terminal 58 of the battery cell or cells. The pull down resistor must have a significantly lower value than the pull up resistor 62.

The disconnect switch circuit, comprised of the mechanical switch and the electronic switch circuit, act to block current flow from the battery pack, unless the latch member is moved to the second position, presumably as a result of the battery pack being attached to the device. While the latch member is in the first position, the mechanical switch is closed. From FIG. 4 it can be seen that this results in the mechanical switch connecting the pull down resistor 66 directly across the control terminal 56 and the negative terminal 58 of the battery cell or cells. Since the pull down resistor is much lower in resistance than the pull up resistor 62, the voltage at the control terminal 56 with respect to the negative terminal 58 is very small, such that the semiconductor switch 52 is off, and the battery cell or cells are disconnected from the battery contact 14. However, once the latch member is moved to the second position, the mechanical switch 24 opens, thereby disconnecting the pull down resistor from the control terminal 56. The pull up resistor 62 provides the control terminal with a higher voltage, and the semiconductor switch closes, thereby connecting the battery cell or cells to the battery contact 14.

In the case where the battery pack is not attached to the device, but the disconnect switch circuit needs to be closed, such as when charging the battery pack by itself, there is a need for a way to close the switch. In one preferred embodiment the battery pack is provided with at least three contacts, including battery contact 14, which as can be seen in FIG. 4, is the negative contact of the battery pack. Typically there are provided one or two auxiliary contacts in addition to the positive 67 contact and negative contact 14.

A first auxiliary contact, such as control contact 68, may be used for a first auxiliary battery component 70, such as, for example, a thermistor, or a memory device. Once the battery pack is inserted into a charger, an electric signal is applied to the control contact to determine, for example, battery pack temperature. To enable charging, a control network 72 is provided, and is connected between the control contact and the control terminal of the semiconductor switch. The control network conditions the electrical signal and applies it to the control terminal, causing the semiconductor switch to close, regardless of the latch member. The control network does this by providing enough current to the pull down resistor to produce a voltage across the semiconductor switch sufficient to cause it to close. The actual design of the control network depends on the specific parameters of the system, such as what type of electrical signal is applied to the control contact, and is left as a design choice to the designer of the circuit. In many cases, however, the electrical signal will be substantially a DC voltage, and the control network may simply be a diode-resistor network.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack having a disconnect switch circuit, comprising:

at least one battery cell;

a battery contact protruding from said battery pack;

an electronic switch circuit disposed in said battery pack and electrically coupled in series between said battery contact and said at least one battery cell;

a mechanical switch for controlling operation of said electronic switch circuit, said electronic switch closing upon said mechanical switch is opening;

a latch member disposed in said battery pack, for controlling operation of said mechanical switch, said latch member moveable between a first position and a second position;

spring means for biasing said latch member to said first position; and wherein said electronic switch circuit disconnects said at least one battery cell from said battery contact when said latch member is in said first position, and connects said at least one battery cell to said battery contact when said latch member is in said second position.

2. A battery pack as defined in claim 1, further comprising:

a control contact for receiving an electrical signal;

a control network connected between said control contact and said electronic switch circuit; and wherein said control network causes said electronic switch circuit to close in response to said electrical signal.

3. A battery pack as defined in claim 1, wherein said latch member has an engaging portion extending from said battery pack.

4. A battery pack as defined in claim 1, wherein said spring means is at least one cantilevered arm extending from said latch member.

5. A battery pack as defined in claim 4, wherein said at least one cantilevered arm is two cantilevered arms.

6. A battery pack as defined in claim 1, wherein said mechanical switch is a push-button switch which is normally open, and having a push-button, said push-button switch being closed when said push-button is depressed.

7. A battery pack as defined in claim 6, wherein said latch member depresses said push-button of said push-button switch when said latch member is in said first position.

8. A battery pack as defined in claim 1, wherein:

said at least one battery cell is further defined by having a positive terminal and a negative terminal;

said electronic switch circuit comprises a semiconductor switch, having power terminals and a control terminal, said power terminals electrically coupled in series between said battery contact and said negative terminal of said at least one battery cell, and a pull-up resistor coupled between said control terminal and said positive terminal of said at least one battery cell; and wherein said mechanical switch is coupled in series with a current limiting resistor between said control terminal of said semiconductor switch and said negative terminal of said at least one battery cell.

9. A battery pack as defined in claim 8, wherein said semiconductor switch is a MOSFET.

10. A battery pack, having at least one battery cell switchably connected to a battery contact, for use with a portable device, comprising:

an electronic switch connected in series with said at least one battery cell;

a mechanical switch for controlling operation of said electronic switch;

a latch member, having an engaging portion for attaching said battery pack to said portable device, and simultaneously controlling operation of said mechanical switch, said latch member moveable between a first position when said battery pack is not attached to said portable device and a second position when said battery pack is attached to said portable device;

wherein when said latch member is in said first position, said mechanical switch causes said electronic switch to open, thereby disconnecting said at least one battery cell from said battery contact; and wherein when said latch member is in said second position, said mechanical switch causes said electronic switch to close, thereby connecting said at least one battery cell to said battery contact.

11. A battery pack as defined in claim 10 wherein said electronic switch is a MOSFET.

\* \* \* \* \*